United States Patent [19]
Kirkhart

[11] 3,970,174
[45] July 20, 1976

[54] LOW WEAR DISK BRAKE ASSEMBLY
[75] Inventor: Fred P. Kirkhart, Atwater, Ohio
[73] Assignee: Goodyear Aerospace Corporation, Akron, Ohio
[22] Filed: May 15, 1975
[21] Appl. No.: 577,914

Related U.S. Application Data
[63] Continuation of Ser. No. 433,860, Jan. 16, 1974, abandoned.

[52] U.S. Cl. .......................... 188/251 A; 188/73.2; 192/107 M; 264/29.5; 423/448
[51] Int. Cl.² ........................................ F16D 69/02
[58] Field of Search ........ 188/251 A, 73.2, 218 XC, 188/71.5; 192/107 M; 423/447

[56] References Cited
UNITED STATES PATENTS

| | | | |
|---|---|---|---|
| 3,730,320 | 5/1973 | Freeder et al. ............. | 188/251 A X |
| 3,759,353 | 9/1973 | Marin ........................ | 188/251 A X |

OTHER PUBLICATIONS
Newling, D. O. et al. *High-performance 'graphitized' carbon/carbon composites*, In Carbon Fibres, Plastics and Polymers Conference Supplement No. 5: pp. 142-153, 1971.

*Primary Examiner*—George E. A. Halvosa
*Attorney, Agent, or Firm*—F. W. Brunner; P. E. Milliken; E. W. Oldham

[57] ABSTRACT

A low wear disk brake assembly has a rotatable body and a fixed axle rotatably supporting the body. A stack of disks having splined portions are aligned alternatingly relative to the axle in the body with each disk characterized by being made from graphite and/or carbon materials such that the disks have flexural strength of greater than 5000 psi and an average interlaminar spacing of crystalline and amorphous carbon of not more than 3.39 angstrom units at 15°C.

10 Claims, 9 Drawing Figures

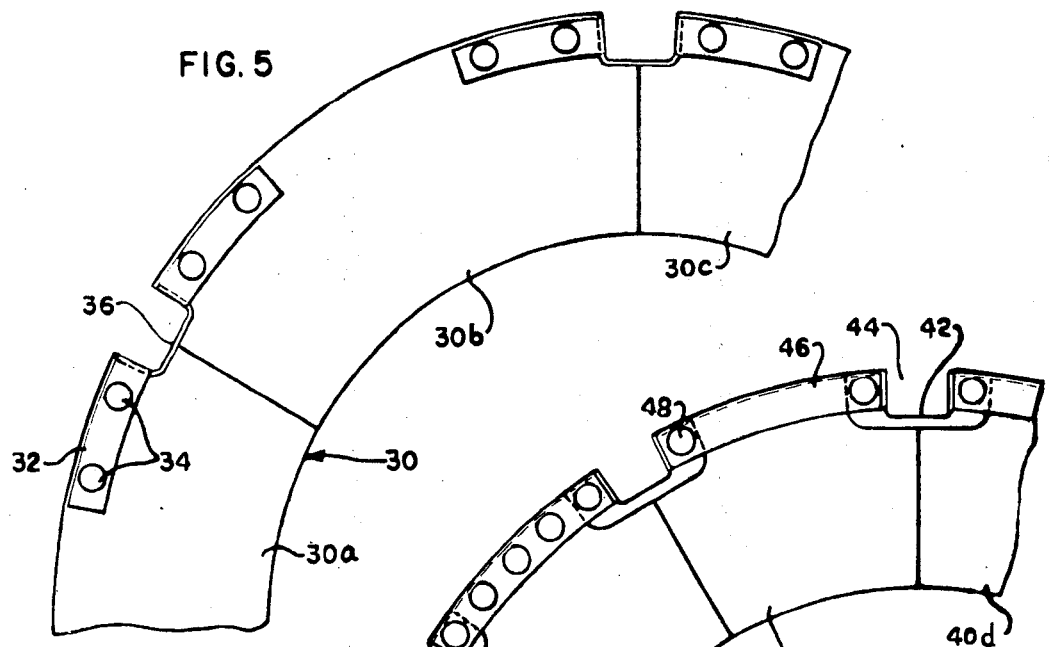
FIG. 5
FIG. 6
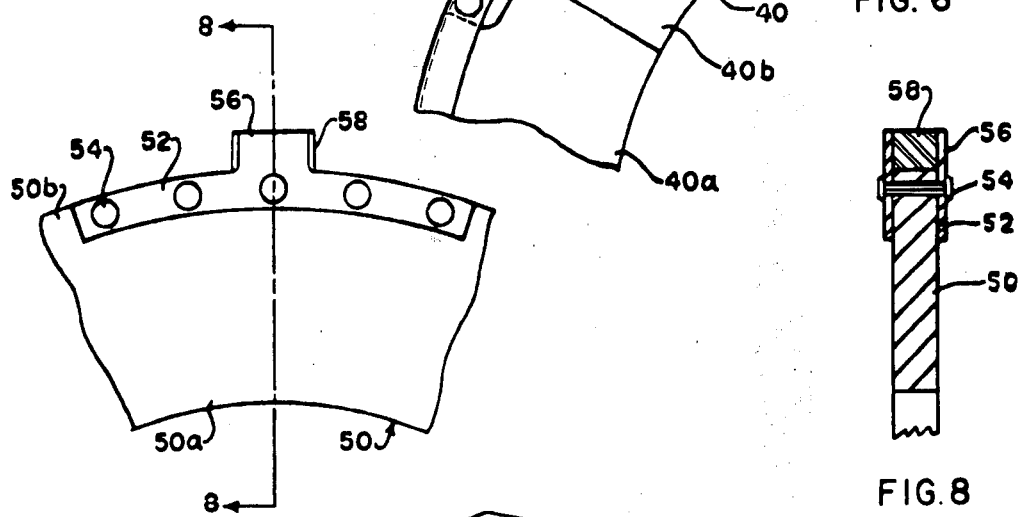
FIG. 7
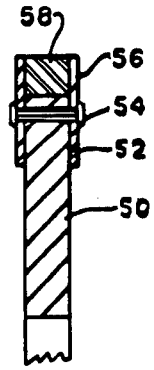
FIG. 8
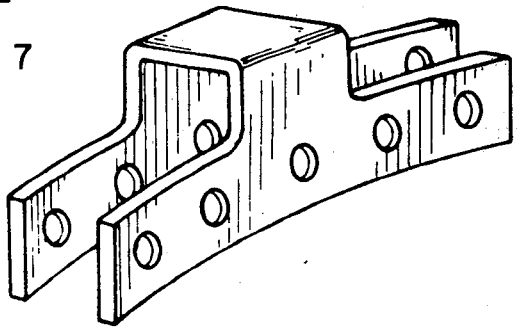
FIG. 9

LOW WEAR DISK BRAKE ASSEMBLY

This is a continuation of application Ser. No. 433,860, filed Jan. 16, 1974, now abandoned.

Thermal stress caused by thermal gradients is the primary cause of disk failure in multi-disk brakes and many attempts have been made to improve the friction materials and/or the heat sink characteristics of disk brakes. High heat input caused by the high aircraft deceleration requirements at high speeds and under great loads results in thermal stress and often causes failure of disks by dishing or cracking, and hence brake failure and a resulting unsafe operation condition.

Additionally, due to the tremendous braking requirements of large jet aircraft, wear rate is an important facet of any disk brake due to high replacement cost as well as in the prevention of brake failure from worn-thin disks.

The general object of the invention is to avoid and overcome the foregoing and other difficulties of and objections to prior art practices by the provision of a homogeneous stack of disks in a disk brake where each disk is light in weight, has a low wear rate, has high heat sink characteristics and also good properties of friction with respect to adjacent disks so that heat dissipation occurs rapidly and brake reliability remains extremely high.

A further object of the invention is to provide a stack of disks in a disk brake which are made from a graphite and/or carbon mixture to provide a combination of light weight high heat sink, low thermal expansion and good frictional braking characteristics.

A still further object of the present invention is to provide a brake disk having high graphitic characteristics and low average interlaminar spacings of crystalline and amorphous carbon.

The aforesaid objects of the invention and other objects which will become apparent as the description proceeds are achieved by providing disks characterized by being homogeneous and made from a carbon-based material having a flexural strength of greater than 5000 psi and an average interlaminar spacing of crystalline and amorphous carbon of not more than 3.39 angstrom units at 15°C.

For a better understanding of the invention reference should be had to the accompanying drawings wherein:

FIG. 5 is a side elevational view of a modified embodiment of the disk utilizing metallic straps reinforcing the torque carrying notches to the disk itself;

FIG. 6 is an elevational view of another modification showing a metallic strap and segmented construction similar to FIG. 5;

FIG. 7 is an elevational view of a metallic strap arranged to the disk to form a driving lug;

FIG. 8 is a vertical cross-sectional view taken on line 8—8 of FIG. 7; and

FIG. 9 is a perspective illustration of a strap to form a driving lug which is a modification of the type shown in FIG. 7.

Figure 1:
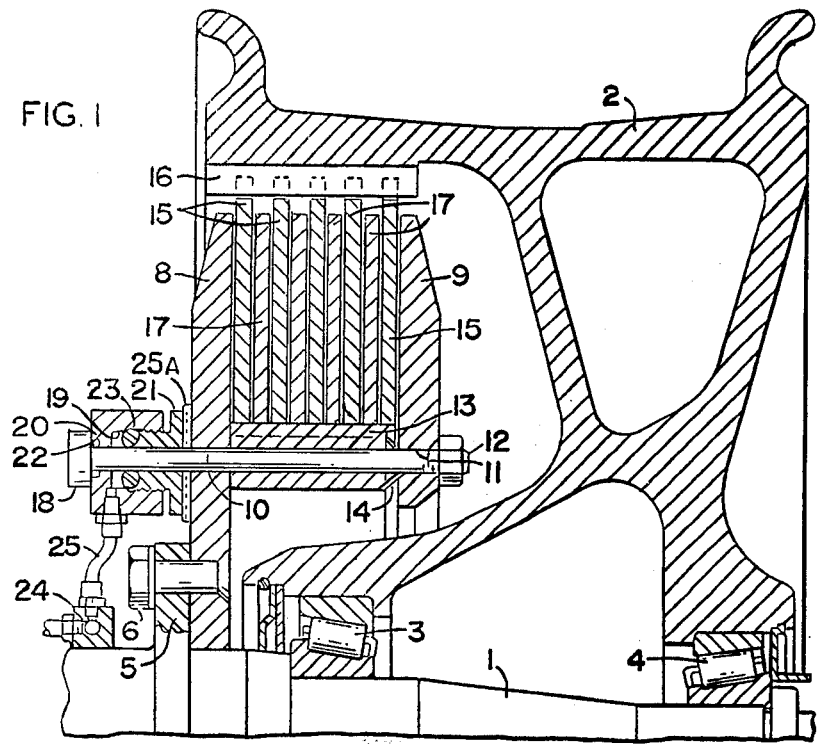
FIG. 1 is a sectional view of a wheel and axle with a brake embodying the present invention, parts being broken-away and parts shown in section.
Figure 2:
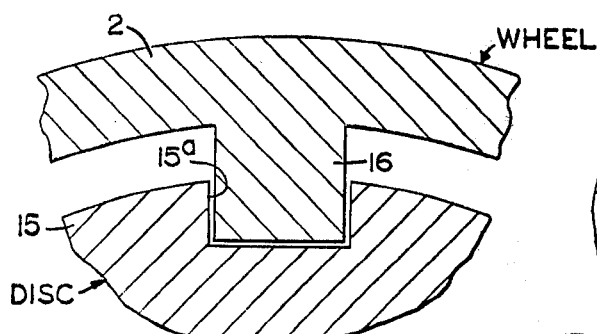
FIG. 2 is an enlarged, broken-away, cross-sectional illustration of a disk in splined relationship to the wheel.

The concepts of the present invention of a low wear brake disc can be utilized in a brake assembly as shown in the drawings. Referring to the drawings, and, first FIG. 1, this shows a non-rotatable axle 1, about which a wheel 2 is mounted for rotation on bearings 3 and 4. The axle is formed with a radial torque flange 5 to which a torque and pressure plate 8 is secured by bolts 6 evenly spaced thereabout. A back plate 9 is provided opposite the pressure plate 8.

The plates 8 and 9 are provided with axially aligned openings 10 and 11 at spaced intervals circumferentially thereof to receive a selected number of assembly bolts 12 spanning the space therebetween. Each bolt 12 extends through holes in a hub-like tubular torque tube 13 normally shorter than the space between the plates 8 and 9 and a spring washer or bellville-type washer 14 is placed about each bolt between one of the pressure plates and the torque tube for the purpose of holding the plates in spaced apart relation and returning them to such position after a braking action. The torque tube 13 is usually bolted by a bolt (not shown) to the torque plate 8 at points circumferentially between the bolts 12.

Between the pressure plate 8 and back plate 9 are a plurality of brake disks 15, for example, each having outer peripheral notches at spaced intervals thereabout for receiving keys 16 carried by the wheel 2, the brake disks 15 being arranged to float axially of the wheel along the keys. Also between plates 8 and 9 are secondary set of brake disks 17 alternately arranged between the brake disks 15 and having notches in their inner peripheries for keyed engagement with splines on torque tube 13 to prevent their rotation, but allowing axial flotation.

Considering now the disks 15 and 17 of the present invention, they are each made of essentially a carbon base material having high sink characteristics and yet sufficient frictional coefficient when rubbed against each other so as to make a homogeneous stack of disks. The term homogeneous is used to indicate that each disk making up the stack is essentially homogeneous in its composition when taken in cross-section, and that each disk is essentially like every other disk, except varying perhaps in thickness or configuration due to its position in the stack. In other words no extra friction material is added to any of the disks. This does not mean that the composition of each disk is exactly uniform across any section thereof as the composition may vary across the disk, or may be laminated, or the like.

The carbon base material may be carbon composites or preferably carbon itself, such as in the form of crystalline graphite or amorphous carbon. Additionally, the carbon base material may be in the form of a carbon or graphite cloth such as that which can, for example, be made from a rayon cloth by pyrolyzing it to form a carbon base material. In either form, a rough disk blank is formed.

Preferably, the blank is impregnated with a hydrocarbon resin or a gas and baked or cured to increase the density of the blank as well as to improve other physical mechanical and thermophysical properties. Although the disk may be impregnated with a hydrocarbon gas via a chemical vapor deposit process, a liquid impregnation is often favored and utilized. As an example, the rough disk blank may be impregnated with a furan resin which generally yields about 50% of carbon by weight so that upon pyrolysis, a high amount of carbon is deposited within the pores and passages of the rough brake disk blank. Another common method would simply be to use coal tar pitch which yields approximately 60% carbon by weight, and densifies better in that it does not tend to seal voids and thus leave gas spots. Pitch carbon is more readily graphitizable upon heating.

Regardless of the impregnation method used, the rough disk blank is heated to cause pyrolization and thus deposit a layer of carbon. The impregnation of a disk blank made from carbon base material and the heating is repeated until density has been brought to a sufficient level. Generally, this requires about 4 to 7 impregnations.

According to the present invention, it has been found that the formation of a highly graphitic carbon brake disk is important to the production of a disk having low wear. A highly graphitic brake disk is that in which the average interlaminar spacing of carbon atoms in the disk at 15°C is not more than 3.39 angstrom units. More specifically, since the interlaminar spacing of 100% crystalline graphite material is 3.3538 angstrom units, a desirable spacing ranges from about 3.356 to about 3.390 angstrom units as determined by x-ray diffraction.

It has been found that desirable highly graphitic carbon brake disks can be formed by baking or curing the disks by heating the disks to temperatues of 2,500°C or above. Usually, the degree of ordering or formation of graphitic type structure increases at higher temperatures. Thus for example, at about 2,800°C, generally from about 80% to about 90% of the disk brake will be graphitic. By bringing the disks up to a temperature of about 3,000°C, an even higher amount of graphite type structure will be formed. The procedure of heating the brake disks to such high temperatures not only increases the graphitic nature of the brake disk, but also increases the density in that the crystallize or graphitic structure causes the carbon to shrink. Although the exact and unexpected reduction in wear rate is not completely understood, it is thought that such change is brought about by any of the following factors or combinations thereof; increased density, increased crystallinity, reduced porosity, increased conductivity, or the decrease in the coefficient of friction due probably to the reduction of voids.

In general, the number of impregnations must be repeated a sufficient number of times to produce a blank having a flexural strength of greater than 5,000 psi and a density greater than 1.40gms per cc. Depending upon the additives and make-up of the disks, the density may be as high as 2.00gms per cc. So long as these requirements are met, a brake disk having low wear can be produced. Moreover, it has been found that such brake disks may have very low impact strengths such as on the order of as low as 5 inch pounds per inch. Of course, the impact strengths may vary to as high as approximately 55 inch pounds per inch.

Other desirable characteristics of the material making up the carbon disks is that the specific heat be greater than 0.17 cal/GM-°L across the normal operating temperature range of the disks and that the conductivity be greater than 0.04 calories -centimeter/square centimeter -second- degree centigrade. Additionally, the coefficient of friction should generally be greater than 0.10 under typical operating conditions and greater than 0.08 under abnormal operating conditions. However, under great or excessive loads, it has been found that the coefficient of friction of the present brake disk under these adverse and strenuous operating conditions may at times be lower than 0.10.

Generally, in order to achieve these characteristics, an amount of carbon or graphite of at least about 75% of the total disk volume is required. The remaining volume of the disk can be composed of strengthening materials selected from the group of tungsten metal, silicon carbide and other high temperature additives. Additionally, it may be desirable to add anti-oxidizing agents selected from the group of metals consisting of boron, tungsten, silicon, zirconium, titanium and the like or their carbides. Also, binders, fillers and reinforcing fibers may also be used and the brake disk may be laminated with respect to fiber mesh materials, or it may have certain sections such as adjacent torque carrying surfaces which, for example, vary in density, make up or composition. Regardless of the various fillers or additives, it is essential to the present invention that at least the final heating of the disk after the final impregnation with resin be carried out at very high temperatures such as in excess of 2,500°C in order to achieve a high amount of graphite ordering or graphitic character. Preferably only the final impregnation is heated to very high temperatures. As with other brake disks, the disks of this invention desirably may be specially treated or reinforced around the drive notches to prevent failure of the brake from strength degradation or oxidation in this critical area.

Figure 4:
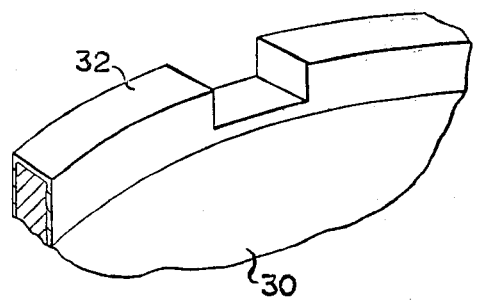
FIG. 4 is a perspective view of a modified embodiment of the invention which utilizes anti-oxidizing coating.

Another technique to prevent oxidation failure is to coat the notches and all non-rubbing portions of the disk with an anti-oxidation coating. This is shown in FIG. 4 of the drawing where the numeral 30 indicates a brake disk of the same characteristics as described above, except an anti-oxidation coating 32 is provided to cover the entire non-rubbed surface of the disk. This coating might be applied by slurry techniques, electrolysis, electroplating, plasma spray, sputtering and vapor depositions. Typical coatings would include electrolysis nickel and electroplated chrome; electroplated nickel and chrome flash; chromium and chromium oxide; silicon carbide; silicon metal; electroplated nickel over copper; and electroplated cadmium over nickel. The coatings will be as thick as necessary, but should range from about 0.002 to about 0.015 inches in thickness.

Referring once again to the brake assembly, the size of the notches in the disks 15 and 17 is generally important to obtain the performance of the homogeneous disk stack required to meet the objects of the invention. To this end, we have found that the sides of the key slot should be located to true position to within not greater than 0.010 inches, but preferably within 0.004 inches. The number of key slots depends upon the disk thickness, torque required, etc., but should be determined so that bearing stress between any one slot and its key 16 is no greater than 5000 psi during normal service operation, and does not exceed 15000 psi during peak short time requirements. The opposite sides of each slot are parallel and in close fitting, flush adjacent relationship with the parallel sides of key 16. The tolerance of clearance between the sides of key 16 and the sides of notch 15a should not be greater than 0.062 inches, and preferably should be between 0.012 and 0.025 inches although this range will vary depending on the particular disk usage. The invention contemplates that there should be a minimum of 4 notches 15a around the outer periphery of disk 15.

Figure 3:
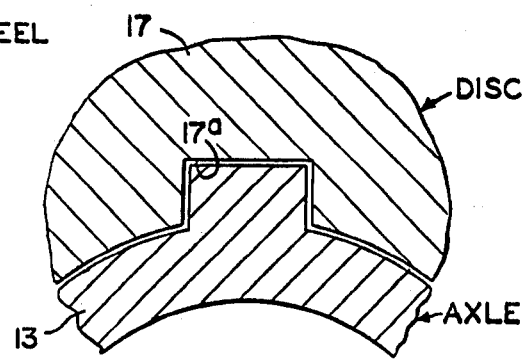
FIG. 3 is an enlarged, broken-away, cross-sectional illustration of a disk in splined relation to the hub or axle.

Similar characteristics are present with respect to disk 17 as shown in FIG. 3 and its respective notches 17a. The splines on the hub or torque tube 13 must fit with substantially the same critical dimensional relationship as set forth with respect to disks 15 and hub 2 above. The actual physical dimensions of notches 17a will be less, however, since they are located on a radially inward surface. However, they will cover substantially the same arcuate distance in degrees as the notches 15a.

In some instances it has been found desirable to actually strengthen the torque or load bearing portions of the disks embodied in FIG. 1–4 with something other than additives to the carbon base material. To this end, the modifications of the invention illustrated in FIGS. 5–9 will be described hereinafter.

Specifically, with respect to the embodiment shown in FIG. 5, a disk indicated generally by numeral 30 is modified by actually being broken into separate segments 30a, 30b and 30c which are easier to form, and substantially eliminate scrap material. The segments are joined together by stamped metallic straps 32 riveted into position by rivets 34, and defining driving notches 36. In effect, the straps 32 are stamped from a single piece of metal with the notch portion 36 bent down to conform to the configuration of the respective disk segments and hold them in abutted aligned relationship as illustrated. The side flaps through which the rivets attach fit in close tolerance around the radially outer peripheral edge of the segments. It is important that the segments 30a, etc. be tightly abutted together and held in the tightly abutted relationship by the straps 32. It should also be understood that the straps 32 could be utilized with the disks of FIGS. 1–4 to strengthen the notch area and are not necessarily exclusively applicable to the segmented design illustrated in FIG. 5. However, the straps very clearly increase the torque carrying capability by distributing the torque loading over a much larger area.

FIG. 6 illustrates a slight modification from the segmented design of FIG. 5. In this embodiment, a disk indicated generally by numeral 40 comprises segments 40a, 40b, etc. In this instance, a small metallic insert 42 extends between adjacent abutted segments and defines a metallic reinforced drive notch or slot 44. A strap 44 is connected by rivets 48 between the adjacent ends of the inserts 42, thus giving a reinforced metallic edge around the entire peripheral surface of the disk 40. This construction is preferable where the disk segments 40a, etc. are shorter and more torque carrying capability is necessary to give strength enhancement and abuse resistance.

FIG. 7 illustrates a disk 50 which had a non-interrupted internal circumference 50a and a non-interrupted external circumference 50b. A torque carrying driving lug or key is formed by a strap 52 held in place to the outer periphery by rivets 54. A pair of radially outwardly extending sides 56 cooperate with a metallic insert 58 brazed or otherwise appropriately secured into position between the sides 56 to define a driving lug or key. FIG. 8 more clearly illustrates the positioning of the insert 58 with respect to the sides 56.

FIG. 9 illustrates a single stamped strap in perspective which might be appropriately secured into position by rivets or the like on the outer circumferential edge of a disk such as disk 50 of FIG. 7, and defining the driving key or lug. This is a possible modification to the construction of FIGS. 7 and 8.

For applying braking pressure to the disk stack, any conventional means to press the plates 8 and 9 towards each other to thus slide the disks 15 and 17 into frictional braking engagement will meet the objects of the invention. One simple arrangement to this end might be the pressure applying means taught by U.S. Pat. No. 3,038,559, also assigned to the same assignee as the instant application. In essence, this system utilizes a circumferential cylinder 19 formed in a collar 20 with an annular piston 21 slidably mounted about a bolt 18 within the cylinder. The cylinder and piston are mounted between the pressure plate 8 and bolt head 18. For sealing the cylinder 19, a sealing ring 22 is mounted between the collar 20 and the bolt and a sealing ring 23 is mounted against the piston 21 within cylinder 19. For providing pressure to the cylinder 19, an annular manifold 24 may be provided about axle 1 and may be supplied by a pipe from a control valve, not shown. Flexible conduits 25 individual to the cylinders 19 connect the cylinders 19 to the manifold 24.

Considering the low wear brake disks, two carbon brake disks were made, one at a heretofore conventional temperature whereas the remaining disk was made at an elevated temperature. More specifically, the first disk was heat treated to a temperature of approximately 2,200°C in its final form. The average interlaminar spacing of the crystalline and amorphous carbon as determined by x-ray diffraction at 15°C was determined to be 3.40 angstrom units which corresponds to about 25% graphitization. The second disk brake was heat treated at a temperature of approximately 2,600°C in its final form. Its average interlaminar spacing at 15°C was 3.37 angstrom units which corresponds to about a 70% graphitization.

Concerning the wear characteristics, each brake disk which had an 8 ½″ OD were subjected to tests. In each test the energy dissipated was about 445,000ft - lb/lbs for 45 total stops plus about 711,000ft - lb/lbs for 5 additional stops. The average wear for each rubbing face per stop was for the less graphitic material (disk brake number 1) 0.00025 inches and for the more graphitic material (disk brake number 2) 0.000015 inches.

Further, the measured impact resistance as determined by the Izod method using unnotched specimens was, for material 1 (less graphitic), 28 inch - lbs/inches, and for material number 2 (more graphitic), 10 inch - lbs/inch, both in direction parallel with the laminations in the material.

Thus as readily apparent, a disc brake having very high graphitic characteristics and a low impact resistance such as 10 inch - lb/inches had a very low wear rate, in excess of 16 times less compared with the brake disk made in a conventional known manner.

The determination of the average interlayer spacing of carbon to carbon atoms was determined as follows.

The diffraction of x-rays from planar arrays of carbon atoms is used in conjunction with Braggs Law to determine the distance between diffracting planes called interlaminar or "d" spacing. The distance between consecutive (A-B) planes ("d" spacing) of a perfectly crystalline graphite is 3.3538 A. The distance between planes of an amorphous carbon is 3.44 A. Analysis of the x-ray diffraction pattern from an intermediate carbon will give an average of crystalline graphite and amorphous carbon which are present. Thus, the so-called percent graphitization can be calculated.

The method used involves perparation of a diffraction sample which contains about 80 w/o sample carbon particles (74um diameter) with about 20 w/o Na Cl (also 74um diameter). This mixed sample is applied to a glass slide in a uniform thickness of about 0.6 mm using collodion. The sample is then scanned from about $52°2\phi$ to $58°2\phi$ which results in a strip chart diffraction pattern over the 004 (h,k,1) peak of graphite and the 222 peak of Na Cl. The sample temperature is recorded. The position of each peak at half peak height is recorded. The position of the Na Cl peak is then compared to the theoretical position of that peak at the sample temperature. The correction, if any, thus observed is then applied to the carbon peak and the "d" spacing calculated from Braggs Law using the corrected peak position. This calculated "d" spacing is then corrected to 15°C using a coefficient of expansion for graphite of $28 \times 10^{-6} C^{-1}$. The percent graphitization is then calculated by the formula:

percent graphitization = $(1-P)100$ where P is calculated from the mathematical expression $$\text{"d"} = 3.440 - 0.086(1-P) - 0.064P(1-P)$$

It is seen that the objects of the invention have been met by providing homogeneous brake stack utilizing a light weight high heat sink material also having sufficient frictional characteristics and low wear characteristics when rubbed in relationship to each other. In effect, the disk stack of the invention utilizing the critical temperature curing relationship set forth will have a much lower wear rate than similar brake disks made according to conventional curing methods. Additionally, the low thermal expansion substantially eliminates thermal stress therefore overcoming the inherent characteristic problems of steel.

While in accordance with the patent statutes only the best known embodiment of the invention has been illustrated and described in detail, it is to be particularly understood that the invention is not limited thereto or thereby but that the inventive scope is defined in the appended claims.

What is claimed is:

1. A low wear disk brake comprising:
   a disk characterized by being made from a carbon base material,
   a flexural strength of greater than 5,000 psi,
   said disk having a density greater than 1.40 grams per cc, and impact strength greater than 5 inch pounds per inch, an amount of carbon or graphite of at least about 75 percent of the total disk volume, and
   an average interlaminar spacing of crystalline and amorphous carbon of not more than 3.39 angstrom units at 15°C.

2. A disk brake as in claim 1 wherein said interlaminar spacing ranges from about 3.35 to about 3.39 angstrom units and a coefficient of friction greater than 0.10.

3. A disk brake as in claim 2 wherein said disk is made by heating a carbon based material in excess of 2,500°C.

4. A disk brake as in claim 3 wherein said disk is made by repeated impregnation and heating steps, the final heating step being in excess of 2,500°C.

5. A disk brake as in claim 1 wherein said disk has thermal conductivity of greater than 0.04 cal/sec/cm²/°C and a friction coefficient of at least 0.08 between adjacent disks over an operating range of from −65°F to 4,000°F.

6. A disk brake as in claim 5 wherein said disk has an impact strength of from 5 to about 55 inch pounds per inch.

7. A low wear disk brake assembly comprising:
   a rotatable body,
   a fixed axle rotatably supporting said body,
   a plurality of disks having portions splined in aligned alternating relation respectively to the axle and the body, each disk characterized by being made from a carbon base material,
   a flexural strength of greater than 5,000 psi,
   said disk having a density greater than 1.40 grams per cc, and impact strength greater than 5 inch pounds per inch, an amount of carbon or graphite of at least about 75 percent of the total disk volume, and
   an average interlaminar spacing of crystalline and amorphous carbon of not more than 3.39 angstrom units at 15°C.

8. A low wear disk brake assembly according to claim 7 wherein said plurality of disks are located in the earth's atmosphere.

9. A process for producing low wear brake disks comprising the steps of:
   a. forming a disk blank of carbon based material,
   b. impregnating said blank with a hydrocarbon liquid or gas,
   c. heating said blank to a temperature of at least 2,500°C, so that a highly graphite blank is produced,
   d. repeating steps b and c a sufficient number of times to produce a blank having a flexural strength greater than 5,000 psi,
   said disk having a density greater than 1.40 grams per cc, and impact strength greater than 5 inch pounds per inch, an amount of carbon or graphite of at least about 75 percent of the total disk volume,
   a density greater than 1.40 grams per c.c. and wherein the average interlaminar spacing of crystalline and amorphous carbon is not more than 3.39 angstrom units at 15°C.

10. A process for producing low wear brake disks as in claim 9 wherein said interlaminar spacing ranges from about 3.35 to about 3.39 angstrom units.

* * * * *